US012643397B2

(12) United States Patent
Natsuga

(10) Patent No.: US 12,643,397 B2
(45) Date of Patent: Jun. 2, 2026

(54) CONTROL APPARATUS FOR VEHICLE

(71) Applicant: TOYOTA JIDOSHA KABUSHIKI KAISHA, Toyota (JP)

(72) Inventor: Yuji Natsuga, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/949,209

(22) Filed: Nov. 15, 2024

(65) Prior Publication Data

US 2025/0229628 A1 Jul. 17, 2025

(30) Foreign Application Priority Data

Jan. 15, 2024 (JP) ................................. 2024-004220

(51) Int. Cl.
*B60K 20/06* (2006.01)
*F16H 59/02* (2006.01)
(52) U.S. Cl.
CPC ............. *B60K 20/06* (2013.01); *F16H 59/02* (2013.01); *F16H 2059/0247* (2013.01)
(58) Field of Classification Search
CPC .. B60K 20/06; F16H 2059/0247; F16H 59/58
See application file for complete search history.

(56) References Cited

U.S. PATENT DOCUMENTS

| | | | |
|---|---|---|---|
| 6,416,440 B1 * | 7/2002 | Jeon .................... | F16H 61/0213 |
| | | | 477/118 |
| 10,295,049 B2 * | 5/2019 | Kojima .................. | F16H 61/02 |
| 10,513,254 B2 * | 12/2019 | Fodor .................. | B60W 10/06 |
| 12,415,519 B2 * | 9/2025 | Yoon .............. | B60W 30/18163 |
| 2009/0266197 A1 | 10/2009 | Onoda et al. | |

FOREIGN PATENT DOCUMENTS

| | | |
|---|---|---|
| JP | 2006-327306 A | 12/2006 |
| JP | 2009-202831 A | 9/2009 |

* cited by examiner

*Primary Examiner* — Huan Le
(74) *Attorney, Agent, or Firm* — Oliff PLC

(57) ABSTRACT

A control apparatus for a vehicle including (i) an input device which is configured to receive a first predetermined operation to request a first predetermined function and a second predetermined operation to request a second predetermined function, and (ii) a steering wheel to which the input device is fixed. The control apparatus is configured to execute a first inverse control and/or a second inverse control. In execution of the first inverse control, the first predetermined function is performed even when the input device receives the second predetermined operation, in a case when a steering angle of the steering wheel is in a first predetermined angle range. In execution of the second inverse control, the second predetermined function is performed even when the input device receives the first predetermined operation, in a case when the steering angle is in a second predetermined angle range.

10 Claims, 5 Drawing Sheets

CONTROL APPARATUS FOR VEHICLE

This application claims priority from Japanese Patent Application No. 2024-004220 filed on Jan. 15, 2024, the disclosure of which is herein incorporated by reference in its entirety.

FIELD OF THE INVENTION

The present invention relates to a control apparatus for a vehicle including (i) an input device configured to receive an operation made by an operator of the vehicle and (ii) a steering wheel to which the input device is fixed.

BACKGROUND OF THE INVENTION

There is well known a vehicle including (i) an input device which is configured to receive a first predetermined operation made by an operator of the vehicle to request a first predetermined function to be performed and a second predetermined operation made by the operator to request a second predetermined function to be performed, and (ii) a steering wheel to which the input device is fixed. For example, JP 2009-202831 A discloses such a vehicle. In the vehicle disclosed in this Japanese Patent Application Publication, the steering wheel is provided with a transmission operating member that is to be operated by the vehicle operator to change a transmission state of the transmission, wherein the transmission operating member includes a pair of operating portions that are located in respective right and left portions of the steering wheel, and wherein an upshift of the transmission is performed by operation of one of the operating portions and a downshift of the transmission is performed by operation of the other of the operating portions.

SUMMARY OF THE INVENTION

An advantage of the input device fixed to the steering wheel is that it is easy to operate the input device while operating the steering wheel. By the way, when an operation amount of the steering wheel operation becomes large, up-down and right-left of the steering wheel could be inverted. As a result, it could be difficult to intuitively understand how to operate the input device to request a desired function among the first predetermined function and the second predetermined function.

The present invention was made in view of the background art described above. It is therefore an object of the present invention to provide a control apparatus for a vehicle, wherein the control apparatus enables an operator of the vehicle to more intuitively operate an input device fixed to a steering wheel of the vehicle.

The object indicated above is achieved according to the following aspects of the present invention.

According to a first aspect of the invention, there is provided a control apparatus for a vehicle including (i) an input device which is configured to receive a first predetermined operation made by an operator of the vehicle to request a first predetermined function to be performed and a second predetermined operation made by the operator to request a second predetermined function to be performed, and (ii) a steering wheel to which the input device is fixed. The control apparatus is configured to execute at least one of a first inverse control and a second inverse control, such that, in execution of the first inverse control, the first predetermined function is performed even when the input device receives the second predetermined operation, in a case when a steering angle of the steering wheel is in a first predetermined angle range in which request of the first predetermined function is expected, and such that, in execution of the second inverse control, the second predetermined function is performed even when the input device receives the first predetermined operation, in a case when the steering angle of the steering wheel is in a second predetermined angle range in which request of the second predetermined function is expected.

According to a second aspect of the invention, in the control apparatus according to the first aspect of the invention, the input device, which is fixed to the steering wheel, includes a first input portion configured to receive the first predetermined operation and a second input portion configured to receive the second predetermined operation, and the first input portion and the second input portion are located in respective positions, which are bilaterally symmetrical to each other when the steering angle of the steering wheel is an angle value allowing the vehicle to move straight.

According to a third aspect of the invention, in the control apparatus according to the first or second aspect of the invention, the vehicle further includes (iii) a power source and (iv) a transmission configured to transmit a power of the power source. The first predetermined function is an upshift of the transmission, while the second predetermined function is a downshift of the transmission. The first predetermined operation is an upshifting operation, while the second predetermined operation is a downshifting operation.

According to a fourth aspect of the invention, in the control apparatus according to the third aspect of the invention, the first inverse control is a downshifting-operation inverse control that is executed in the case when the steering angle of the steering wheel is in the first predetermined angle range, with a running speed of the vehicle or a rotational speed of the power source being in a predetermined high speed range in which the request of the upshift of the transmission as the first predetermined function is expected. In execution of the downshifting-operation inverse control as the first inverse control, the upshift of the transmission as the first predetermined function is performed even when the input device receives the downshifting operation as the second predetermined operation.

According to a fifth aspect of the invention, in the control apparatus according to the fourth aspect of the invention, the downshifting-operation inverse control is executed when the vehicle is in an acceleration ON state, and is not executed when the vehicle is in an acceleration OFF state.

According to a sixth aspect of the invention, in the control apparatus according to any one of the third through fifth aspects of the invention, the second inverse control is an upshifting-operation inverse control that is executed in the case when the steering angle of the steering wheel is in the second predetermined angle range, with a running speed of the vehicle or a rotational speed of the power source being in a predetermined low speed range in which the request of the downshift of the transmission as the second predetermined function is expected. In execution of the upshifting-operation inverse control as the second inverse control, the downshift of the transmission as the second predetermined function is performed even when the input device receives the upshifting operation as the first predetermined operation.

According to a seventh aspect of the invention, in the control apparatus according to any one of the first through sixth aspects of the invention, at least one of the first inverse control and the second inverse control is executed when a predetermined drive mode suitable for a sports driving is being established in the vehicle, and any of the first inverse control and the second inverse control is not executed when the predetermined drive mode suitable for the sports driving is not being established in the vehicle.

According to an eighth aspect of the invention, in the control apparatus according to the seventh aspect of the invention, the predetermined drive mode is a drift mode in which the vehicle is driven in such a way that enables the vehicle to easily skid when turning, or a sports mode in which the vehicle is driven in such a way that enables the vehicle to run with a priority given to a power performance rather than to an energy efficiency.

According to a ninth aspect of the invention, in the control apparatus according to any one of the first through eighth aspects of the invention, at least one of the first inverse control and the second inverse control is executed during execution of a drift driving for causing the vehicle to skid when turning, and any of the first inverse control and the second inverse control is not executed when the drift driving is not being executed.

According to a tenth aspect of the invention, in the control apparatus according to the ninth aspect of the invention, it is determined whether the drift driving is being executed or not, depending on whether a direction of a lateral acceleration of the vehicle is the same as a steering direction of the steering wheel or not, when the vehicle is turning.

In the control apparatus according to the first aspect of the invention, at least one of the first inverse control and the second inverse control is executed, such that, in execution of the first inverse control, the first predetermined function is performed even when the input device receives the second predetermined operation, in the case when the steering angle of the steering wheel is in the first predetermined angle range, and such that, in execution of the second inverse control, the second predetermined function is performed even when the input device receives the first predetermined operation, in the case when the steering angle of the steering wheel is in the second predetermined angle range. Thus, when the steering angle is in the first predetermined angle range, it is possible to request the first predetermined function to be performed by any of the first predetermined operation and the second predetermined operation. Further, when the steering angle is in the second predetermined angle range, it is possible to request the second predetermined function to be performed by any of the first predetermined operation and the second predetermined operation. Thus, the input device fixed to the steering wheel can be operated more intuitively by the operator.

In the control apparatus according to the second aspect of the invention, the input device may include the first input portion configured to receive the first predetermined operation and the second input portion configured to receive the second predetermined operation, wherein the first input portion and the second input portion are located in respective positions, which are bilaterally symmetrical to each other, in the steering wheel. Thus, when the steering angle is in the first predetermined angle range, the operation of any of the first input portion and the second input portion is accepted as the first predetermined operation. Further, when the steering angle is in the second predetermined angle range, the operation of any of the first input portion and the second input portion is accepted as the second predetermined operation.

In the control apparatus according to the third aspect of the invention, the first predetermined function may be the upshift of the transmission while the second predetermined function may be the downshift of the transmission, and the first predetermined operation may be the upshifting operation while the second predetermined operation may be the downshifting operation. Thus, when the steering angle is in the first predetermined angle range, it is possible to request the upshift to be performed by any of the upshifting operation and the downshifting operation. Further, when the steering angle is in the second predetermined angle range, it is possible to request the downshift to be performed by any of the upshifting operation and the downshifting operation.

In the control apparatus according to the fourth aspect of the invention, the first inverse control may be the downshifting-operation inverse control that is executed in the case when the steering angle of the steering wheel is in the first predetermined angle range, with the running speed of the vehicle or the rotational speed of the power source being in the predetermined high speed range in which the request of the upshift of the transmission as the first predetermined function is expected. In execution of the downshifting-operation inverse control as the first inverse control, the downshifting operation is accepted as the upshifting operation, namely, the upshift as the first predetermined function is performed even when the input device receives the downshifting operation as the second predetermined operation. Thus, when the running speed of the vehicle or the rotational speed of the power source is in the predetermined high speed range in which the request of the upshift is expected, it is possible to request the upshift to be performed by even the downshifting operation.

In the control apparatus according to the fifth aspect of the invention, the downshifting-operation inverse control may be executed when the vehicle is in the acceleration ON state, and may not be executed when the vehicle is in the acceleration OFF state. Thus, in the acceleration ON state in which the running speed of the vehicle and the rotational speed of the power source are likely to be increased, a need for the upshift is high, so that the upshifting operation is more likely to be accepted. On the other hand, in the acceleration OFF state in which the running speed of the vehicle and the rotational speed of the power source are unlikely to be increased, the need for the upshift is low, so that the upshifting operation is less likely to be accepted.

In the control apparatus according to the sixth aspect of the invention, the second inverse control may be the upshifting-operation inverse control that is executed in the case when the steering angle of the steering wheel is in the second predetermined angle range, with the running speed of the vehicle or the rotational speed of the power source being in the predetermined low speed range in which the request of the downshift of the transmission as the second predetermined function is expected. In execution of the upshifting-operation inverse control as the second inverse control, the upshifting operation is accepted as the downshifting operation, namely, the downshift as the second predetermined function is performed even when the input device receives the upshifting operation as the first predetermined operation. Thus, when the running speed of the vehicle or the rotational speed of the power source is in the predetermined low speed range in which the request of the downshift is expected, it is possible to request the downshift to be performed by even the upshifting operation.

In the control apparatus according to the seventh aspect of the invention, at least one of the first inverse control and the second inverse control may be executed when the predetermined drive mode suitable for the sports driving is being established in the vehicle, and any of the first inverse control and the second inverse control may not be executed when the predetermined drive mode is not being established in the vehicle. Thus, in the predetermined drive mode in which the operation of the input device to request a desired function may be difficult to intuitively understand, the first inverse control and/or the second inverse control is executed. On the other hand, in a non-predetermined drive mode in which the operation of the input device to request the desired function is easy to intuitively understand, the first inverse control and the second inverse control are not executed and a normal control is executed whereby the first predetermined operation and the second predetermined operation are accepted as they are.

In the control apparatus according to the eighth aspect of the invention, the predetermined drive mode may be the drift mode or the sports mode. Thus, the first inverse control and/or the second inverse control is executed in the drift mode or the sports mode in which the operation of the input device to request a desired function may be difficult to intuitively understand.

In the control apparatus according to the ninth aspect of the invention, the first inverse control and/or the second inverse control may be executed during execution of the drift driving, and the first inverse control and the second inverse control may not be executed when the drift driving is not being executed. Thus, during execution of the drift driving in which the operation of the input device to request a desired function may be difficult to intuitively understand, the first inverse control and/or the second inverse control is executed. On the other hand, during execution of a normal driving in which the operation of the input device to request the desired function is easy to intuitively understand, the first inverse control and the second inverse control are not executed and the normal control is executed whereby the first predetermined operation and the second predetermined operation are accepted as they are.

In the control apparatus according to the tenth aspect of the invention, it may be determined whether the drift driving is being executed or not, depending on whether the direction of the lateral acceleration of the vehicle is the same as the steering direction of the steering wheel or not, when the vehicle is turning. Thus, it can be appropriately determined whether the drift driving is being executed or not.

DETAILED DESCRIPTION OF PREFERRED EMBODIMENT

Hereinafter, an embodiment of the invention will be described in detail with reference to the accompanying drawings.

Embodiment

Figure 1:
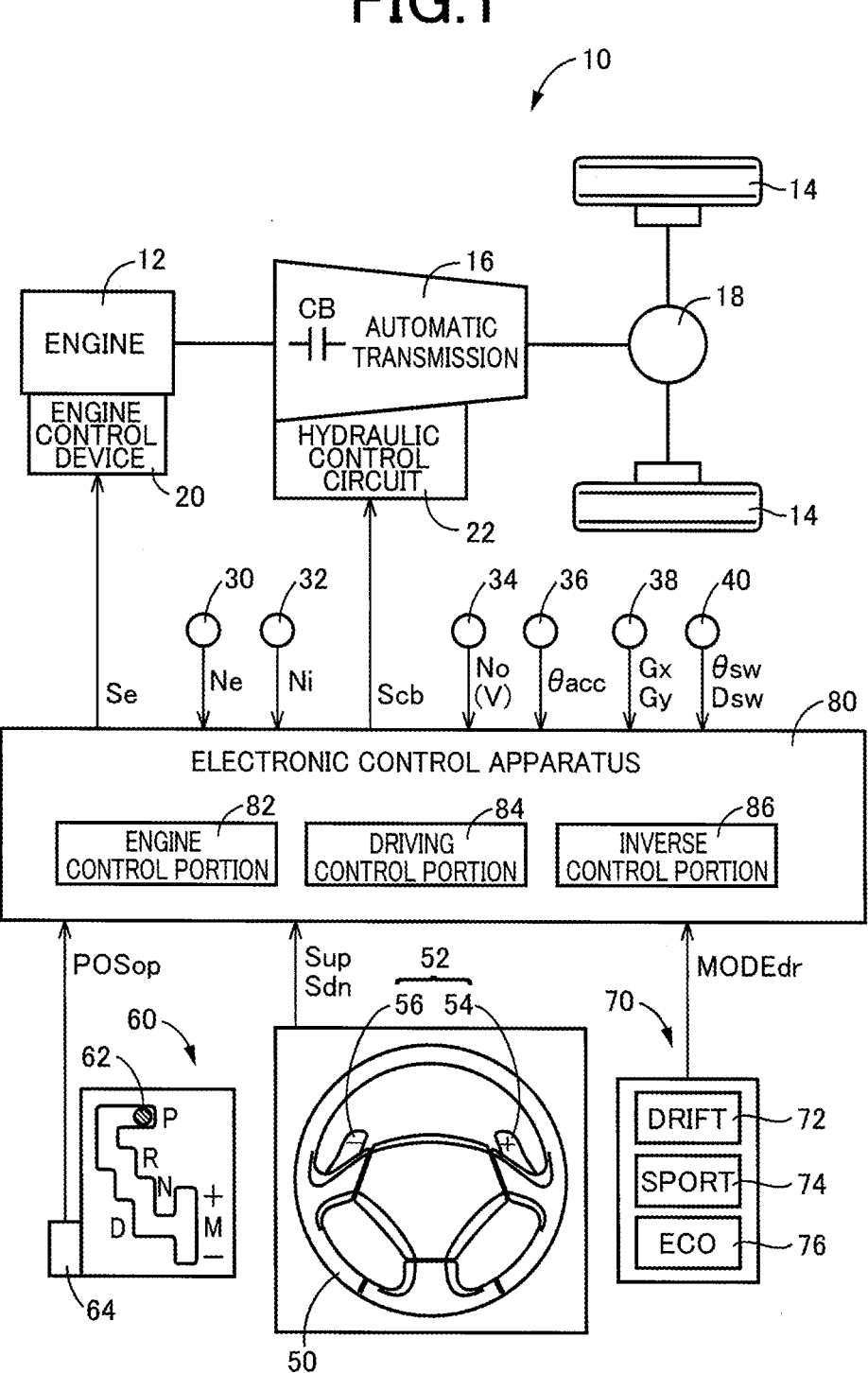
FIG. 1 is a view schematically showing a construction of a vehicle to which the present invention is applied, and major parts of control functions and systems for various controls executed in the vehicle.

FIG. 1 is a view schematically showing a construction of a vehicle 10 to which the present invention is applied, and major parts of control functions and systems for various controls executed in the vehicle 10. As shown in FIG. 1, the vehicle 10 includes an engine 12 as a power source, drive wheels 14 and an automatic transmission 16 that is provided in a power transmitting path between the engine 12 and the drive wheels 14.

The engine 12 is, for example, a known internal combustion engine. The vehicle 10 further includes an engine control device 20 and an electronic control apparatus 80. An engine torque Te, which is an output torque of the engine 12, is controlled with the engine control device 20 being controlled by the electronic control apparatus 80.

The automatic transmission 16 is a step-variable automatic transmission configured to establish a selected one of a plurality of gear positions GS, with a corresponding one or ones of a plurality of engagement devices CB being engaged, wherein the gear positions GS are different from each other in gear ratio (speed ratios) $\gamma at$ (=Ni/No). The automatic transmission 16 is a transmission configured to transmit a power of the engine 12. "Ni" represents a transmission input rotational speed Ni that is an input rotational speed of the automatic transmission 16. "No" represents a transmission output rotational speed No that is an output rotational speed of the automatic transmission 16. Each of the engagement devices CB is a known hydraulically-operated frictional engagement device, for example. Each of the engagement devices CB receives a regulated engaging hydraulic pressure supplied from a hydraulic control circuit 22 that is provided in the vehicle 10, whereby an engaging torque is changed and its controlled state is switched among an engaged state and a released state, for example.

In the vehicle 10, the power outputted from the engine 12 is transmitted to the drive wheels 14 sequentially via the automatic transmission 16 and a differential gear device 18, for example. The power corresponds to a torque and a force unless they are to be distinguished from one another.

The vehicle 10 is further provided with the electronic control apparatus (controller) 80 which is constructed according to the present invention and which is related to controls of the engine 12 and the automatic transmission 16, for example. The electronic control apparatus 90 includes a so-called microcomputer incorporating a CPU, a ROM, a RAM and an input-output interface. The CPU performs various controls in the vehicle 10, by processing various input signals, according to control programs stored in the ROM, while utilizing a temporary data storage function of the RAM.

The electronic control apparatus 80 receives various input signals based on values detected by respective sensors provided in the vehicle 10. Specifically, the electronic control apparatus 80 receives: an output signal of an engine speed sensor 30 indicative of an engine rotational speed Ne; an output signal of an input speed sensor 32 indicative of the transmission input rotational speed Ni; an output signal of an output speed sensor 34 indicative of the transmission output rotational speed No; an output signal of an accelerator-opening degree sensor 36 indicative of an accelerator opening degree $\theta acc$; an output signal of an acceleration sensor 38 indicative of a longitudinal acceleration Gx and a lateral acceleration Gy of the vehicle 10; and an output signal of a steering sensor 40 indicative of a steering angle $\theta sw$ and a steering direction Dsw.

The engine rotational speed Ne is a rotational speed of the engine 12. The transmission output rotational speed No is a rotational speed corresponding to a running speed V of the vehicle 10. The accelerator opening degree θacc is an accelerator operation amount representing an amount of accelerating operation made by an operator of the vehicle 10 (i.e., vehicle driver), and is a signal corresponding to an amount of acceleration requested by the operator. The steering angle θsw is a steering angle of a steering wheel 50 provided in the vehicle 10. The steering direction Dsw is a steering direction of the steering wheel 50.

The vehicle 10 further includes a shift operation device 60. The shift operation device 60 is a shift switching device for switching one of a plurality of operation positions POSop (i.e., shift ranges Rsh) of the automatic transmission 16, to another one of the operation positions POSop. The shift operation device 60 includes a shift lever 62 and a shift position sensor 64. The shift lever 62 is a shift operating member that is to be manually operated by the operator to select one of the plurality of operation positions POSop. The shift position sensor 64 is a sensor configured to detect a currently selected one of the operation positions POSop. The electronic control apparatus 80 receives a signal indicative of the currently selected one of the operation positions POSop, which is detected by the shift position sensor 64.

The plurality of operation positions POSop include P, R, N, D and M operation positions, for example, which are different in a power transmission state of the automatic transmission 16. The shift ranges Rsh include P, R, N and D ranges, for example, which are different in the power transmission state of the automatic transmission 16. "POSop" shown in FIG. 1 represents a signal indicative of the currently selected one of the operation positions POSop.

The P (parking) operation position is one of the operation positions POSop that is to be selected for establishing the P range of the automatic transmission 16 in which the automatic transmission 16 is placed in a neutral state and an output rotary member of the automatic transmission 16 is mechanically fixed so as to be unrotatable. The neutral state of the automatic transmission 16 is a state in which any one of the gear positions GS is not established so that a power transmission is interrupted in the automatic transmission 16. The R (reverse-drive) operation position is one of the operation positions POSop that is to be selected for establishing the R range of the automatic transmission 16 for enabling the vehicle 10 to perform a reverse running. The N (neutral) operation position is one of the operation positions POSop that is to be selected for establishing the N range of the automatic transmission 16 in which the automatic transmission 16 is placed in the neutral state. The D (forward-drive) operation position is one of the operation positions POSop that is to be selected for establishing the D range of the automatic transmission 16 for enabling the vehicle 10 to perform a forward running by executing an automatic shifting control. The M (manual-shift) operation position is one of the operation positions POSop that is to be selected for establishing the M range of the automatic transmission 16 for enabling the vehicle 10 to perform the forward running by executing a manual shifting control that is executed for switching one of the gear positions GS to another one of the gear positions GS, namely, for executing a shifting action in the automatic transmission 16. That is, the M operation position is an operation position for enabling the manual shifting control in which one of the gear positions GS of the automatic transmission 16 is switched to another one of the gear positions GS by operation of the operator. The M operation position has an upshifting operation position "+"

for upshifting one of the gear positions GS to another one of the gear positions GS with each operation of the shift lever 62 to the upshifting operation position "+", and a downshifting operation position "−" for downshifting one of the gear positions GS to another one of the gear positions GS with each operation of the shift lever 62 to the downshifting operation position "−". The operation of the shift lever 62 to the upshifting operation position "+" is an upshifting operation requesting an upshift of the automatic transmission 16. The operation of the shift lever 62 to the downshifting operation position "−" is a downshifting operation requesting a downshift of the automatic transmission 16. When the D operation position as one of the operation positions POSop is selected, an automatic shifting mode is established whereby the automatic transmission 16 can be automatically shifted in accordance with a known shifting map. When the M operation position as one of the operation positions POSop is selected, a manual shifting mode is established whereby the automatic transmission 16 can be shifted by a shifting operation made by the operator.

The vehicle 10 further includes a pair of paddle switches 52 that are fixed to the steering wheel 50. The paddle switches 52 constitute an input device configured to receive a first predetermined operation made by the operator to request a first predetermined function to be performed and a second predetermined operation made by the operator to request a second predetermined function to be performed. The first predetermined function is the upshift of the automatic transmission 16, for example. The second predetermined function is the downshift of the automatic transmission 16, for example. The first predetermined operation is the upshifting operation requesting the upshift of the automatic transmission 16. The second predetermined operation is the downshifting operation requesting the downshift of the automatic transmission 16. The paddle switches 52 are operating members through which operations equivalent to the above-described operation of the shift lever 62 to the upshifting operation position "+" and operation of the shift lever 62 to the downshifting operation position "−" can be made.

The paddle switches 52, which constitute the input device, includes a first input portion in the form of an upshifting switch 54 configured to receive the upshifting operation as the first predetermined operation, and a second input portion in the form of a downshifting switch 56 configured to receive the downshifting operation as the second predetermined operation. The upshifting switch 54 and the downshifting switch 56 are located in respective positions, which are bilaterally symmetrical to each other when the steering angle of the steering wheel 50 is an angle value allowing the vehicle 10 to move straight. The upshifting switch 54 and the downshifting switch 56 can be operated toward the operator while holding the steering wheel 50, for example, to perform gear shifting operations equivalent to those performed by the shift lever 62. When the upshifting switch 54 or the downshifting switch 56 is operated while the shift lever 62 is in the M operation position or the D operation position, the manual shifting mode is established and a currently established one of the gear positions GS of the automatic transmission 16 is switched to another one of the gear positions GS. Each time when the upshifting switch 54 is operated by the operator, an upshift requesting signal Sup requesting the upshift of the automatic transmission 16 is supplied to the electronic control apparatus 80. Each time when the downshifting switch 56 is operated by the operator, a downshift requesting signal Sdn requesting the downshift of the automatic transmission 16 is supplied to the electronic control apparatus 80.

The vehicle 10 further includes a mode selection switch 70 that is to be operated when one of drive modes MODEdr is to be established in the vehicle 10. The drive modes MODEdr include a normal mode, a sports mode (i.e., power mode), an eco mode and a drift mode. The normal mode is a predetermined drive mode for driving the vehicle 10 in a state of a good energy efficiency while deriving a power performance. The sports mode is a predetermined drive mode for driving the vehicle 10 in a state in which a higher priority is given to the power performance rather than to the energy efficiency, as compared to the normal mode. The eco mode is a predetermined drive mode for driving the vehicle 10 in a state in which a higher priority is given to the energy efficiency rather than to the power performance, as compared to the normal mode. The drift mode is a predetermined drive mode for driving the vehicle 10 in such a way that the vehicle 10 can easily skid when turning. That is, the drift mode is a drive mode suitable for drift driving, i.e., driving in which the vehicle 10 is made to skid when turning. Each of the sports mode and the drift mode is a predetermined drive mode MODEdrf suitable for a sports driving.

The mode selection switch 70 includes a drift mode switch 72, a sports mode switch 74 and an eco mode switch 76, for switching one of the drive modes MODEdr to another one of the drive modes MODEdr. The drift mode switch 72 is a switch for setting the drift mode as one of the drive modes MODEdr. The sports mode switch 74 is a switch for setting the sports mode as one of the drive modes MODEdr. The eco mode switch 76 is a switch for setting the eco mode as one of the drive modes MODEdr. A signal indicative of one of the drive modes MODEdr, which is detected by the mode selection switch 70, is supplied to the electronic control apparatus 80. When any one of the drift mode switch 72, sports mode switch 74 and eco mode switch 76 is not operated, the normal mode as one of the drive modes MODEdr is set.

The electronic control apparatus 80 outputs various command signals to various devices provided in the vehicle 10, wherein the various devices include the above-described engine control device 20 and hydraulic control circuit 22, for example, and wherein the various command signals include an engine control command signal Se and an engaging hydraulic-pressure control command signal Scb, for example. The engaging hydraulic-pressure control command signal Scb is a signal indicative of a command value of the engaging hydraulic pressure of each of the engagement devices CB, for example.

The electronic control apparatus 80 includes an engine control portion 82 and a driving control portion 84, for executing various controls in the vehicle 10.

The engine control portion 82 calculates a requested drive amount of the vehicle 10 requested by the operator, by applying the accelerator opening degree θacc and the vehicle running speed V, for examples, to a requested drive amount map that represents a pre-stored relationship obtained by experimentation or determined by an appropriate design theory. The engine control portion 82 outputs the engine control command signal Se for controlling the engine 12 such that the engine torque Te realizing the requested drive amount is obtained.

The driving control portion 84 executes the shifting control of the automatic transmission 16. When the D operation position as one of the operation positions POSop is being selected, the driving control portion 84 establishes the automatic shifting mode. In the automatic shifting mode, the driving control portion 84 determines whether the upshift or downshift of the automatic transmission 16 is to be performed or not, by using the predetermined shifting map, and outputs the engaging hydraulic-pressure control command signal Scb for executing the shifting control of the automatic transmission 16 in accordance with a result of the determination. On the other hand, when the M operation position as one of the operation positions POSop is being selected, or when the D operation position as one of the operation positions POSop is being selected and the paddle switches 52 have been operated, the driving control portion 84 establishes the manual shifting mode. In the manual shifting mode, the driving control portion 84 outputs the engaging hydraulic-pressure control command signal Scb for executing the shifting control of the automatic transmission 16 so as to establish one of the gear positions GS in accordance with the operation of the shift lever 62 in the M operation position or the operation of the paddle switches 52.

When the normal mode as one of the drive modes MODEdr is being set, the driving control portion 84 executes the automatic shifting control using a normal-state shifting map that is predefined such that the vehicle 10 can be driven with one of the gear positions GS in which the energy efficiency and the power performance are well-balanced. When the sports mode as one of the drive modes MODEdr is being set, the driving control portion 84 executes the automatic shifting control using a sports-driving-state shifting map that is predefined such that a lower one of the gear positions GS is more likely to be selected as compared to in the normal-state shifting map. When the eco mode as one of the drive modes MODEdr is being set, the driving control portion 84 executes the automatic shifting control using an eco-driving-state shifting map that is predefined such that a higher one of the gear positions GS is more likely to be selected as compared to in the normal-state shifting map.

When the drift mode as one of the drive modes MODEdr is being set, the driving control portion 84 controls a state of the vehicle 10 to a state suitable for the drift driving, for example. In the drift mode, for example, the driving control portion 84 places the differential gear device 18 in a differential locking state for limiting a differential state in which the right and left drive wheels 14 are allowed to be rotated in respective speeds different from each other. The driving control portion 84 places the differential gear device 18 in the differential locking state, for example, by placing a dog clutch (not shown) into an engaged state, wherein the dog clutch selectively connects and disconnects between a differential casing and a differential side gear of the differential gear device 18. It is noted that, where the vehicle 10 is an all-wheel drive vehicle (i.e., AWD vehicle), more drive power may be distributed to rear wheels of the vehicle 10 in the drift mode.

By the way, when the steering angle θsw is made large, there is a risk that correspondence between the upshifting and downshifting switches 54, 56 and the upshifting and downshifting operations could not be intuitively understood.

Therefore, the electronic control apparatus 80 invalidates the "+" and "−" in the paddle switches 52, depending on the steering angle θsw, and accepts either the upshifting switch 54 or the downshifting switch 56 as the same gear shift request regardless of which one of the upshifting switch 54 and downshifting switch 56 is operated. To this end, the electronic control apparatus 80 further includes an inverse control portion 86 for enabling the operate the paddle switches 52 more intuitively.

Figures 2A, 2B, 2C:
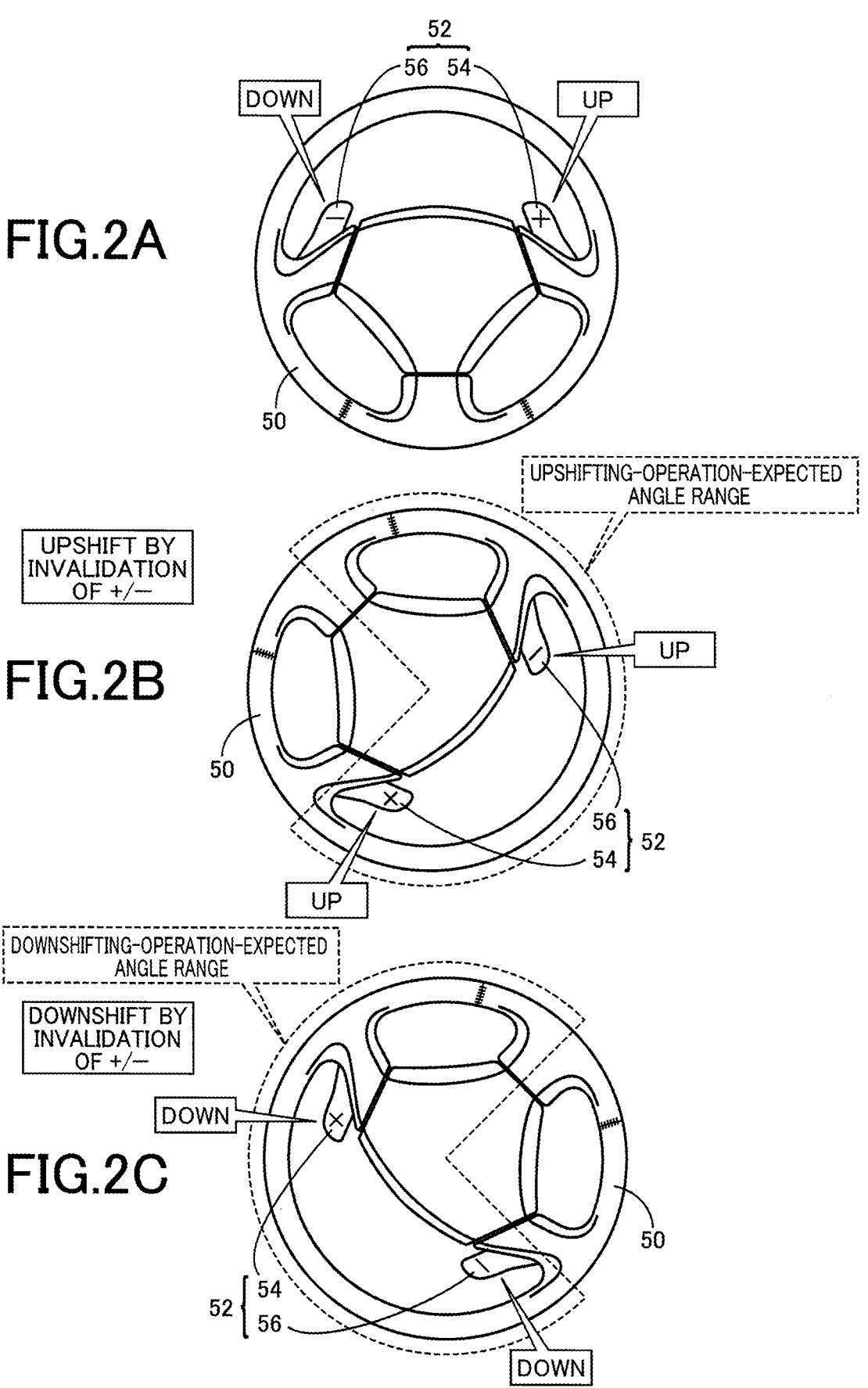
FIGS. 2A, 2B and 2C are views showing ranges of a steering angle, which invalidate "+" and "−" in paddle switches.

FIGS. 2A, 2B and 2C are views showing ranges of the steering angle θsw, which invalidate "+" and "−" in the paddle switches 52. FIG. 2A shows a state of the steering wheel 50 in which the steering angle θsw is zero. FIG. 2B shows, by way of example, a state in which request of the upshift of the automatic transmission 16 is expected so that the "+" and "−" in the paddle switches 52 are invalidated. FIG. 2C shows, by way of example, a state in which request of the downshift of the automatic transmission 16 is expected so that the "+" and "−" in the paddle switches 52 are invalidated.

When the steering angle θs is in an upshifting-operation-expected angle range θswup, the inverse control portion 86 executes a downshifting-operation inverse control CNTrdn as a first inverse control that is a kind of an inverse control CNTr in which the downshifting operation received in the downshifting switch 56 is accepted as the upshifting operation. The upshifting-operation-expected angle range θswup is a first predetermined angle range in which the request of the upshift of the automatic transmission 16 is expected. For example, as shown in FIG. 2B, the upshifting-operation-expected angle range θswup is an angle range in which the paddle switches 52 can be operated by a right hand of the operator when the request of the upshift of the automatic transmission 16 is expected. In the upshifting-operation-expected angle range θswup, the "+" and "−" in the paddle switches 52 are invalidated, and the upshift of the automatic transmission 16 is requested regardless of which one of the upshifting switch 54 and downshifting switch 56 is operated. That is, in the upshifting-operation-expected angle range θswup in which the request of the upshift is expected, the upshifting operation is performed even when the downshifting switch 56 is operated.

When the steering angle θs is in a downshifting-operation-expected angle range θswdh, the inverse control portion 86 executes an upshifting-operation inverse control CNTrup as a second inverse control that is a kind of the inverse control CNTr in which the upshifting operation received in the upshifting switch 54 is accepted as the downshifting operation. The downshifting-operation expected angle range θswdh is a second predetermined angle range in which the request of the downshift of the automatic transmission 16 is expected. For example, as shown in FIG. 2C, the downshifting-operation expected angle range θswdh is an angle range in which the paddle switches 52 can be operated by a left hand of the operator when the request of the downshift of the automatic transmission 16 is expected. In the downshifting-operation-expected angle range θswdh, the "+" and "−" in the paddle switches 52 are invalidated, and the downshift of the automatic transmission 16 is requested regardless of which one of the upshifting switch 54 and downshifting switch 56 is operated. That is, in the downshifting-operation-expected angle range θswdh in which the request of the downshift is expected, the downshifting operation is performed even when the upshifting switch 54 is operated.

When the engine rotational speed Ne is in a relatively high speed range, the request of the upshift of the automatic transmission 16 is expected for preventing the engine 12 from being rotated at an excessively high speed because the engine rotational speed Ne could be in an excessively high speed range by the downshift of the automatic transmission 16. Further, when the engine rotational speed Ne is in a relatively low speed range, the request of the downshift of the automatic transmission 16 is expected for increasing the drive power. The engine rotational speed Ne is uniquely determined by the vehicle running speed V and the gear ratio yat of the automatic transmission 16. Therefore, a region in which the engine rotational speed Ne is relatively high can be considered as a region in which the vehicle running speed V is relatively high, and a region in which the engine rotational speed Ne is relatively low can be considered as a region in which the vehicle running speed V is relatively low.

The inverse control portion 86 executes the downshifting-operation inverse control CNTrdn when the vehicle running speed V or the engine rotational speed Ne is in the upshift-ing-operation expected speed range Nup and the steering angle θsw is in the upshifting-operation-expected angle range θswup. The upshifting-operation expected speed range Nup is a predetermined high speed range in which the request of the upshift of the transmission 16 as the first predetermined function is expected.

The inverse control portion 86 executes the upshifting-operation inverse control CNTrup when the vehicle running speed V or the engine rotational speed Ne is in the down-shifting-operation expected speed range Ndn and the steering angle θsw is in the downshifting-operation-expected angle range θswdn. The downshifting-operation expected speed range Ndn is a predetermined low speed range in which the request of the downshift of the transmission 16 as the second predetermined function is expected.

Figure 3:
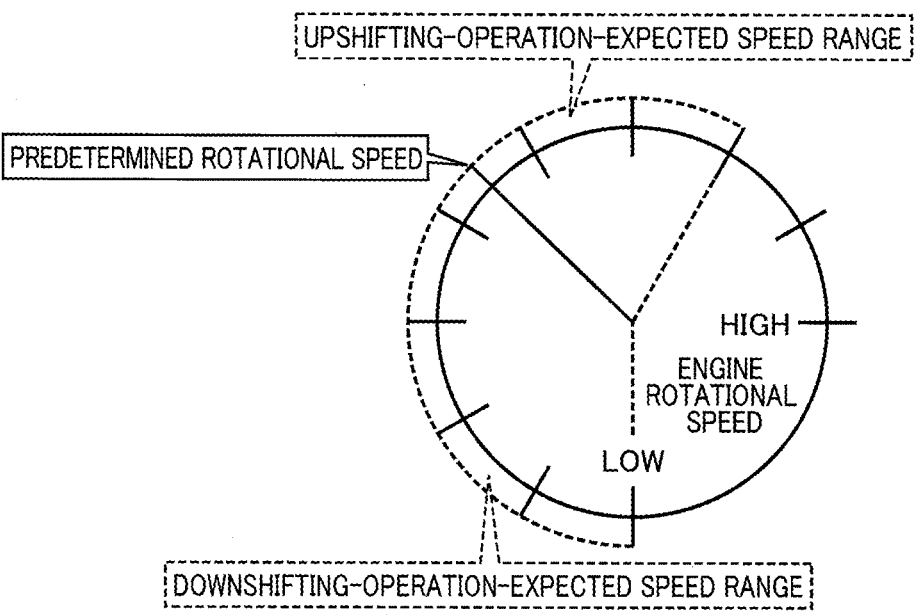
FIG. 3 is a view showing, by way of examples, an upshifting-operation expected speed range and a downshifting-operation expected speed range.

FIG. 3 is a view showing, by way of examples, the upshifting-operation expected speed range Nup and the downshifting-operation expected speed range Ndn. As shown in FIG. 3, the upshifting-operation expected speed range Nup is a range of the engine rotational speed Ne that is not lower than a predetermined rotational speed Nef and is lower than an excessively high speed range, and the downshifting-operation expected speed range Ndn is a range of the engine rotational speed Ne that is lower than the predetermined rotational speed Nef and is not lower than zero (or an independently-rotatable rotational speed). During a normal operation of the engine 12, the engine rotational speed Ne is not in the excessively high speed range. When the engine rotational speed Ne is not lower than the predetermined rotational speed Nef, the inverse control portion 86 determines that the engine rotational speed Ne is in the upshifting operation expected speed range Nup. When the engine rotational speed Ne is lower than the predetermined rotational speed Nef, the inverse control portion 86 determines that the engine rotational speed Ne is in the downshifting-operation expected speed range Ndn. The vehicle running speed V may be determined in the same way as the engine rotational speed Ne.

During the shift of the automatic transmission 16, the engine rotational speed Ne is changed depending on a difference of the gear ratio yat between adjacent gear positions GS. The predetermined rotational speed Nef may be determined, for example, by taking account of the difference of the gear ratio yat between the gear positions GS. For example, where the difference of the gear ratio yat is large, the engine rotational speed Ne after the downshift of the automatic transmission 16 is considerably increased to be more likely to be in the excessively high speed range, so that the predetermined rotational speed Nef is set to a lower value. Alternatively, the predetermined rotational speed Nef may be set for each gear position GS, by taking account of the driving power after the shift of the automatic transmission 16.

In an acceleration ON state, the vehicle running speed V and the engine rotational speed Ne are likely to be increased and accordingly there is a risk that the engine rotational speed Ne could be in the excessively high speed range, so that there is a high need for the upshifting of the automatic transmission 16. On the other hand, in an acceleration OFF state, the vehicle running speed V and the engine rotational speed Ne are unlikely to be increase, so that there is a low need for the upshifting of the automatic transmission 16. Therefore, the inverse control portion 86 executes the down-shifting-operation inverse control CNTrdn in the accelera-tion ON state, but does not execute the downshifting-operation inverse control CNTrdn in the acceleration OFF state. The acceleration ON state is, for example, a state in which the accelerator opening degree θacc is determined to be a value that exceeds zero. The acceleration OFF state is, for example, a state in which the accelerator opening degree θacc is determined to be zero.

In the sports driving such as the drift driving, the steering angle θsw is likely to become large and there is little time to consider a state of the steering wheel 50. As a result, the correspondence between the upshifting and downshifting switches 54, 56 and the upshifting and downshifting opera-tions could become difficult to intuitively understand.

Therefore, the inverse control portion 86 executes the inverse control CNTr when the predetermined drive mode MODEdrf is being established in the vehicle 10, but does not execute the inverse control CNTr when the predetermined drive mode MODEdrf is not being established in the vehicle 10. Alternatively, the inverse control portion 86 execute the inverse control CNTr when drift driving is being performed, but does not execute the inverse control CNTr when drift driving is not being performed.

Figure 4:
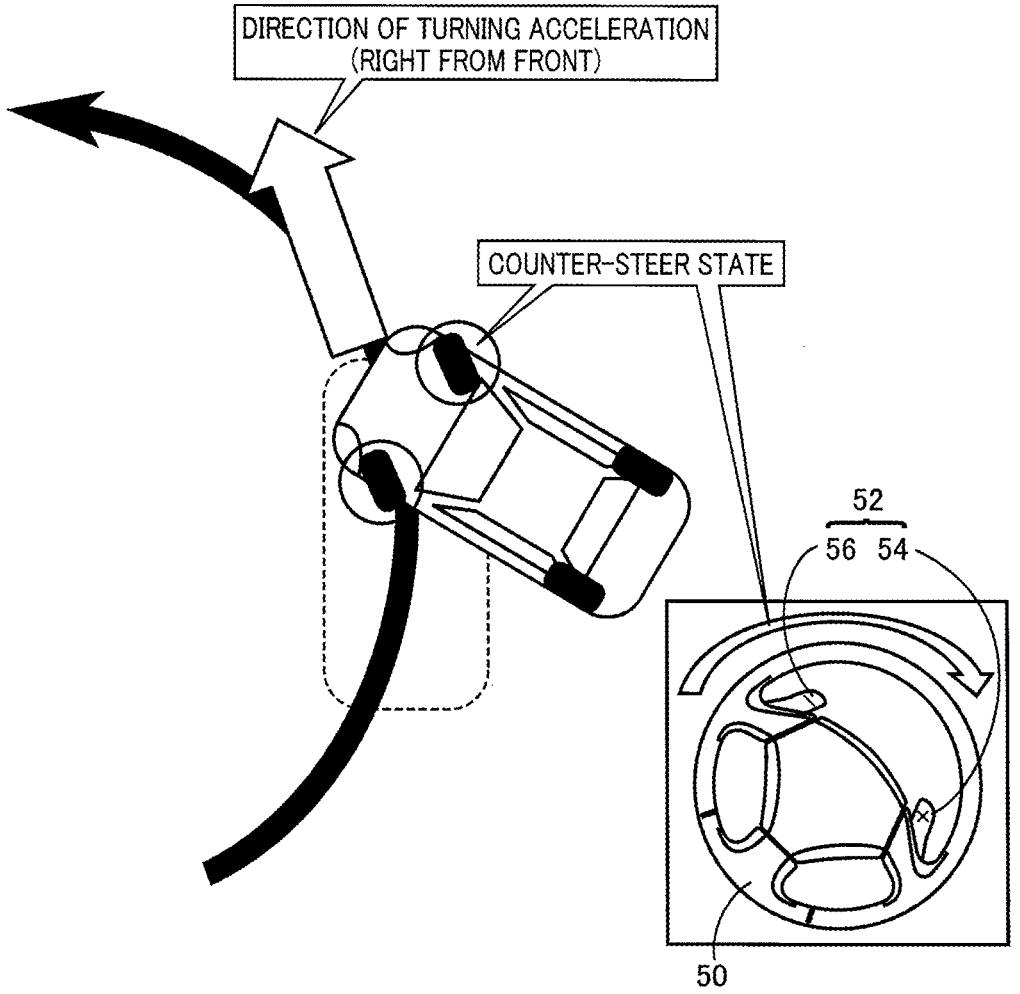
FIG. 4 is a view showing, by way of example, a determination of a drift driving.

FIG. 4 is a view showing, by way of example, a deter-mination of the drift driving. It is determined that the drift driving is being performed, when the vehicle 10 is in a counter-steer state, as shown in FIG. 4, in which the steering wheel 50 is turned rightward during leftward turning of the vehicle 10. Normally, when the steering wheel 50 is turned leftward during leftward turning of the vehicle 10, a turning acceleration is generated rightward. On the other hand, when the drift driving is being performed during leftward running of the vehicle 10, the steering wheel 50 is turned rightward, and the turning acceleration is generated rightward. The inverse control portion 86 determines whether the drift driving is being performed or not, depending on whether a direction of the turning acceleration and the steering direc-tion Dsw of the steering wheel 50 are the same or not. The turning acceleration is a lateral acceleration Gy during turning of the vehicle 10.

Figure 5:
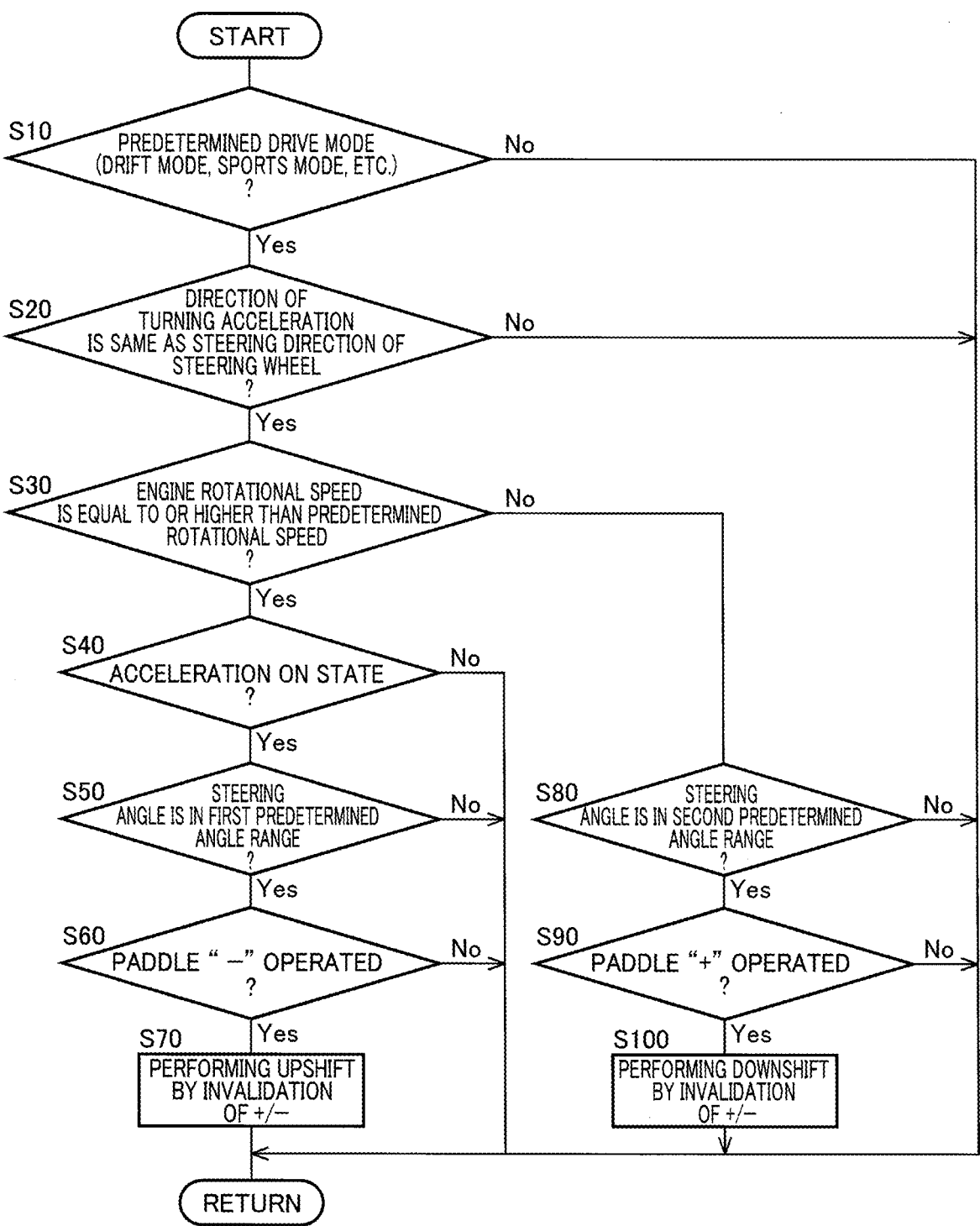
FIG. 5 is a flow chart showing a main part of a control operation made by an electronic control apparatus, namely, a control routine that is executed for enabling an operator of the vehicle to operate the paddle switches more intuitively.

FIG. 5 is a flow chart showing a main part of a control operation made by the electronic control apparatus 80, namely, a control routine that is executed for enabling the operator of the vehicle 10 to operate the paddle switches 52 more intuitively. This control routine is executed, for example, in a repeated manner.

Each step of the control routine shown in the flow chart of FIG. 5 corresponds to function of the inverse control portion 86. As shown in FIG. 5, the control routine is initiated with step S10 that is implemented to determine whether the predetermined drive mode MODEdrf (such as the drift mode and the sports mode) is being established in the vehicle 10 or not. When a negative determination is made at step S10, one cycle of execution of the control routine is terminated. When an affirmative determination is made at step S10, it is determined at step S20 whether the direction of the turning acceleration is the same as the steering direction Dsw of the steering wheel 50 or not. When a negative determination is made at step S20, one cycle of execution of the control routine is terminated. When an affirmative determination is made at step S20, it is deter-mined at step S30 whether the engine rotational speed Ne is equal to or higher than the predetermined rotational speed Nef. When an affirmative determination is made at step S30, it is determined at step S40 whether the acceleration ON state is being established or not. When a negative determi-nation is made at step S40, one cycle of execution of the control routine is terminated. When an affirmative determi-nation is made at step S40, it is determined at step S50 whether the steering angle θsw is in the upshifting-opera-tion-expected angle range θswup (first predetermined angle range) or not. At step S50, it is determined whether the vehicle 10 being turned rightward or leftward, and then the upshifting-operation-expected angle range θswup is set. That is, the steering angle θsw is defined by a positive or negative value depending on the steering direction Dsw, and the upshifting-operation-expected angle range θswup is set in accordance with the to a turning direction of the vehicle 10. When a negative determination is made at step S50, one cycle of execution of the control routine is terminated. When an affirmative determination is made at step S50, it is determined at step S60 whether the downshifting switch 56 has being operated or not. When a negative determination is made at step S60, one cycle of execution of the control routine is terminated. When an affirmative determination is made at step S60, step S70 is implemented to invalidate the "+" and "−" in the paddle switches 52, and to the upshift of the automatic transmission 16 is performed in response to the request of the upshift. That is, at step S70, it is deter-mined that this is a situation in which the upshift of the automatic transmission 16 is actually desired, and the upshift is performed. It is noted that, when the upshifting switch 54 has been operated, the upshifting operation is accepted as a normal operation. On the other hand, when a negative determination is made at step S30, the control flow goes to step S80 that is implemented to determine whether the steering angle θsw is in the downshifting-operation-expected angle range θswdn (second predetermined angle range) or not. At step S80, it is determined whether the vehicle 10 being turned rightward or leftward, and then the downshifting-operation-expected angle range θswdn is set. When a negative determination is made at step S80, one cycle of execution of the control routine is terminated. When an affirmative determination is made at step S80, it is determined at step S90 whether the upshifting switch 54 has being operated or not. When a negative determination is made at step S90, one cycle of execution of the control routine is terminated. When an affirmative determination is made at step S90, step S100 is implemented to invalidate the "+" and "−" in the paddle switches 52, and to the downshift of the automatic transmission 16 is performed in response to the request of the downshift. That is, at step S100, it is determined that this is a situation in which the downshift of the automatic transmission 16 is actually desired, and the downshift is performed. It is noted that, when the down-shifting switch 56 has been operated, the downshifting operation is accepted as a normal operation.

As described above, in the present embodiment, the downshifting-operation inverse control CNTrdn is executed in the case when the steering angle θsw is in the upshifting-operation-expected angle range θswup, and the upshifting-operation inverse control CNTrup is executed in the case when the steering angle θsw is in the downshifting-opera-tion-expected angle range θswdn. Thus, when the steering angle θsw is in the upshifting-operation-expected angle range θswup, it is possible to request the upshift to be performed by any of the upshifting operation and the downshifting operation. Further, when the steering angle θsw is in the downshifting-operation-expected angle range θswdn, it is possible to request the second predetermined function to be performed by any of the upshifting operation and the downshifting operation. Thus, the paddle switches 52 fixed to the steering wheel 50 can be operated more intuitively by the operator.

In the present embodiment, the paddle switches 52 include the upshifting switch 54 and the downshifting switch 56 provided in respective positions, which are bilaterally symmetrical to each other, in the steering wheel 50. Thus, when the steering angle θsw is in the upshifting-operation-expected angle range θswup, the operation of any of the upshifting switch 54 and the downshifting switch 56 is accepted as the upshifting operation. Further, when the steering angle θsw is in the downshifting-operation-expected angle range θswdn, the operation of any of the upshifting switch 54 and the downshifting switch 56 is accepted as the downshifting operation.

In the present embodiment, when the steering angle θsw is in the upshifting-operation-expected angle range θswup, with the vehicle running speed V or the engine rotational speed Ne being in the upshifting-operation expected speed range Nup, the downshifting-operation inverse control CNTrdn is executed. Thus, it is possible to request the upshift to be performed by even the downshifting operation, when the vehicle running speed V or the engine rotational speed Ne is in the upshifting-operation expected speed range Nup.

In the present embodiment, the downshifting-operation inverse control CNTrdn is executed when the acceleration ON state is established in the vehicle 10, and is not executed when the acceleration OFF state is established in the vehicle 10. Thus, in the acceleration ON state in which the vehicle running speed V and the engine rotational speed Ne are likely to be increased, the upshifting operation is more likely to be accepted. On the other hand, in the acceleration OFF state in which the vehicle running speed V and engine rotational speed Ne are unlikely to be increased, tue upshifting operations are less likely to be accepted.

In the present embodiment, the upshifting operation inverse control CNTrup is executed in the case when the steering angle θsw is in the downshifting-operation-expected angle range θswdn, with the vehicle running speed V or the engine rotational speed Ne being in the downshifting-operation expected speed range Ndn. Thus, when the vehicle running speed V or the engine rotational speed Ne is in the downshifting-operation expected speed range Ndn, it is possible to request the downshift to be performed by even the upshifting operation.

In the present embodiment, the inverse control CNTr is executed when the predetermined drive mode MODEdrf is being established in the vehicle 10, and the inverse control CNTr is not executed when the predetermined drive mode MODEdrf is not being established in the vehicle 10. Thus, in the predetermined drive mode MODEdrf in which the operation of the paddle switches 52 to request a desired function may be difficult to intuitively understand, the inverse control CNTr is executed. On the other hand, in a non-predetermined drive mode in which the operation of the paddle switches 52 to request the desired function is easy to intuitively understand, the inverse control CNTr is not executed and a normal control is executed whereby the upshifting operation and the downshifting operation are accepted as they are.

In the present embodiment, the predetermined drive mode MODEdrf is the drift mode or the sports mode. Thus, the inverse control CNTr is executed in the drift mode or the sports mode in which the operation of the paddle switches 52 to request a desired function may be difficult to intuitively understand.

In the present embodiment, the inverse control CNTr is executed during execution of the drift driving, and is not executed when the drift driving is not being executed. Thus, during execution of the drift driving in which the operation of the paddle switches 52 to request a desired function may be difficult to intuitively understand, the inverse control CNTr is executed. On the other hand, during execution of a normal driving in which the operation of the paddle switches 52 to request the desired function is easy to intuitively understand, the inverse control CNTr is not executed and the normal control is executed whereby the upshifting operation and the downshifting operation are accepted as they are.

In the present embodiment, it is determined whether the drift driving is being executed or not, depending on whether the direction of the turning acceleration of the vehicle 10 is the same as the steering direction Dsw of the steering wheel 50 or not, when the vehicle 10 is turning. Thus, it can be appropriately determined whether the drift driving is being executed or not.

Further, it is possible to prevent the upshifting or downshifting operation from being erroneously made during execution of the drift driving. In order to avoid an erroneous operation, it was previously necessary to use a lever operation to the upshifting operation position "+" or downshifting operation position "−" in the shift operation device 60, but now it is possible to give gear shift instructions without the operator's hand being taken off the steering wheel 50. It is useful for a vehicle that does not have the upshifting operation position "+" or downshifting operation position "−".

While the preferred embodiment of the invention has been described in detail by reference to the drawings, it is to be understood that the invention may be otherwise embodied.

For example, in the above-described embodiment, the inverse control CNTr includes the downshifting-operation inverse control CNTrdn and the upshifting-operation inverse control CNTrup. However, the inverse control CNTr does not necessarily have to include both of the downshifting-operation inverse control CNTrdn and the upshifting-operation inverse control CNTrup, as long as including at least one of the downshifting-operation inverse control CNTrdn and the upshifting-operation inverse control CNTrup. That is, the downshifting-operation inverse control CNTrdn is executed when the steering angle θsw is in the upshifting-operation expected angle range θswup, but the upshifting-operation inverse control CNTrup does not have to be executed even when the steering angle θsw is in the downshifting-operation-expected angle range θswdn. Alternatively, the upshifting-operation inverse control CNTrup is executed when the steering angle θsw is in the downshifting-operation-expected angle range θswdn, but the downshifting-operation inverse control CNTrdn does not have to be executed even when the steering angle θsw is in the upshifting-operation-expected angle range θswup. Even in these arrangements, it is possible to obtain a certain effect that the operator can operate the paddle switches 52 more intuitively.

In the above-described embodiment, the paddle switches 52 including the upshifting switch 54 and the downshifting switch 56 constitutes the input device configured to receive the first predetermined operation and the second predetermined operation. However, this is not essential to the invention. For example, the input device may be constituted by a device configured to receive the first predetermined operation and the second predetermined operation through different operations made on the single device, wherein the different operations to be made on the single device are, for example, upward and downward operations, or leftward and rightward operations, or forward and backward operations, which are made on switches and levers.

In the above-described embodiment, the power source is constituted by the engine 12 by way of example. However, this is not essential to the invention. For example, an electric motor may be used as another power source in addition to or in place of the engine 12. Further, in the above-described embodiment, the transmission configured to transmit the power of the power source is constituted by the automatic transmission 16 by way of example. However, this is not essential to the invention, either. For example, the transmission may be constituted by any one of other type transmissions such as a synchronous mesh twin shaft parallel axis-type automatic transmission including a known DCT (Dual Clutch Transmission), a known belt-type continuously variable transmission and a known electrically-operated continuously variable transmission.

In the above-described embodiment, it is determined whether the inverse control CNTr is to be executed or not, depending on whether the engine rotational speed Ne is at least the predetermined rotational speed Nef or not. However, this is not essential to the invention. For example, it may be determined whether the inverse control CNTr is to be executed or not, regardless of whether the engine rotational speed Ne is at least the predetermined rotational speed Nef or not. That is, in the control routine shown in the flow chart of FIG. 5, step S30 does not necessarily have to be implemented. Further, in the above-described embodiment, it is determined whether the inverse control CNTr is to be executed or not, depending on whether the predetermined drive mode MODEdrf is being established or not. However, this is not essential to the invention. For example, it may be determined whether the inverse control CNTr is to be executed or not, regardless of whether the predetermined drive mode MODEdrf is being established or not. That is, in the control routine shown in the flow chart of FIG. 5, step S10 does not necessarily have to be implemented. Further, in the above-described embodiment, it is determined whether the inverse control CNTr is to be executed or not, depending on whether the drift driving is being performed or not. However, this is not essential to the invention. For example, it may be determined whether the inverse control CNTr is to be executed or not, regardless of whether the drift driving is being performed or not. That is, in the control routine shown in the flow chart of FIG. 5, step S20 does not necessarily have to be implemented. Moreover, in the above-described embodiment, it is determined whether the inverse control CNTr is to be executed or not, depending on whether the acceleration ON state is being established or not. However, this is not essential to the invention. For example, it may be determined whether the inverse control CNTr is to be executed or not, regardless of whether the acceleration ON state is being established or not. That is, in the control routine shown in the flow chart of FIG. 5, step S40 does not necessarily have to be implemented.

In the above-described embodiment, in execution of the downshifting-operation inverse control CNTrdn, the downshifting operation made in the shift operation device 60 to the "−" may be accepted as the upshifting operation, for example. Further, in execution of the upshifting-operation inverse control CNTrup, the upshifting operation made in the shift operation device 60 to the "−" may be accepted as the downshifting operation, for example.

In the above-described embodiment, in execution of the downshifting-operation inverse control CNTrdn, a kickdown operation made on an accelerator pedal may be accepted as the upshifting operation. The kickdown operation is the downshifting operation that is performed by turning on a switch that is provided in a position in which the accelerator pedal is further depressed than its fully open position. In this case, a pedaling force required for the kickdown operation may be set higher than where when this function (in which the kickdown operation made on the accelerator pedal is accepted as the upshifting operation in the execution of the downshifting-operation inverse control CNTrdn) is not available.

In the above-described embodiment, it is possible that setting of the inverse control CNTr setting could be difficult to match the operator's preferences and intentions. For example, it is possible that the downshift that is performed by invalidation of the "+" and "−" in the paddle switches 52 could be difficult to match the operator's preferences and intentions. For this reason, as a personalization function, for example, only the upshift may be performed by invalidation of the "+" and "−" in the paddle switches 52. Further, the predetermined rotational speed Nef for determining the upshifting-operation expected speed range Nup or the downshifting-operation expected speed range Ndn, may be adjusted depending on the operator's preferences. Moreover, since the operation of the steering wheel 50 has individual characteristics of each operator, the upshifting-operation-expected angle range θswup or the downshifting-operation-expected angle range θswdn may be changed depending on the operator.

In the above-described embodiment, there is a case in which an automatic upshift is performed to prevent the engine rotational speed Ne from being in the excessively high speed range. In this case, there is a possibility that the upshift could be performed in double during execution of the inverse control CNTr (particularly, the downshifting-operation inverse control CNTrdn). Therefore, where the automatic upshift is performed in the vehicle, the automatic upshift may be inhibited during execution of the inverse control CNTr, for example, for preventing the upshift from being performed in double.

It is to be understood that the embodiment described above is given for illustrative purpose only, and that the present invention may be embodied with various modifications and improvements which may occur to those skilled in the art.

NOMENCLATURE OF ELEMENTS

10: vehicle
12: engine (power source)
16: automatic transmission (transmission)
50: steering wheel
52: paddle switches (input device)
54: upshifting switch (first input portion)
56: downshifting switch (second input portion)
80: electronic control apparatus (control apparatus)

What is claimed is:

1. A control apparatus for a vehicle including (i) an input device which is configured to receive a first predetermined operation made by an operator of the vehicle to request a first predetermined function to be performed and a second predetermined operation made by the operator to request a second predetermined function to be performed, and (ii) a steering wheel to which the input device is fixed, wherein the control apparatus is configured to execute at least one of a first inverse control and a second inverse control, each inverse control being a control mode in which the control apparatus interprets a received predetermined operation as the other predetermined operation such that, in execution of the first inverse control, the first predetermined function is performed even when the input device receives the second predetermined operation, in a case when a steering angle of the steering wheel is in a first predetermined angle range in which request of the first predetermined function is expected, and such that, in execution of the second inverse control, the second predetermined function is performed even when the input device receives the first predetermined operation, in a case when the steering angle of the steering wheel is in a second predetermined angle range in which request of the second predetermined function is expected.

2. The control apparatus according to claim 1, wherein the input device, which is fixed to the steering wheel, includes a first input portion configured to receive the first predetermined operation and a second input portion configured to receive the second predetermined operation, and wherein the first input portion and the second input portion are located in respective positions, which are bilaterally symmetrical to each other when the steering angle of the steering wheel is an angle value allowing the vehicle to move straight.

3. The control apparatus according to claim 1, wherein the vehicle further includes (iii) a power source and (iv) a transmission configured to transmit a power of the power source, wherein the first predetermined function is an upshift of the transmission, while the second predetermined function is a downshift of the transmission, and wherein the first predetermined operation is an upshifting operation, while the second predetermined operation is a downshifting operation.

4. The control apparatus according to claim 3, wherein the first inverse control is a downshifting-operation inverse control that is executed in the case when the steering angle of the steering wheel is in the first predetermined angle range, with a running speed of the vehicle or a rotational speed of the power source being in a predetermined high speed range in which the request of the upshift of the transmission as the first predetermined function is expected, and wherein, in execution of the downshifting-operation inverse control as the first inverse control, the upshift of the transmission as the first predetermined function is performed even when the input device receives the downshifting operation as the second predetermined operation.

5. The control apparatus according to claim 4, wherein the downshifting-operation inverse control is executed when the vehicle is in an acceleration ON state, and is not executed when the vehicle is in an acceleration OFF state.

6. The control apparatus according to claim 3, wherein the second inverse control is an upshifting-operation inverse control that is executed in the case when the steering angle of the steering wheel is in the second predetermined angle range, with a running speed of the vehicle or a rotational speed of the power source being in a predetermined low speed range in which the request of the downshift of the transmission as the second predetermined function is expected, and wherein, in execution of the upshifting-operation inverse control as the second inverse control, the downshift of the transmission as the second predetermined function is performed even when the input device receives the upshifting operation as the first predetermined operation.

7. The control apparatus according to claim 1, wherein at least one of the first inverse control and the second inverse control is executed when a predetermined drive mode suitable for a sports driving is being established in the vehicle, and wherein any of the first inverse control and the second inverse control is not executed when the predetermined drive mode suitable for the sports driving is not being established in the vehicle.

8. The control apparatus according to claim 7, wherein the predetermined drive mode is a drift mode in which the vehicle is controlled to allow the vehicle to easily skid when turning, or a sports mode in which the vehicle is controlled according to a shifting map that prioritizes a power performance over an energy efficiency.

9. The control apparatus according to claim 1, wherein at least one of the first inverse control and the second inverse control is executed during execution of a drift driving for causing the vehicle to skid when turning, and wherein any of the first inverse control and the second inverse control is not executed when the drift driving is not being executed.

10. The control apparatus according to claim 9, wherein it is determined whether the drift driving is being executed or not, depending on whether a direction of a lateral acceleration of the vehicle is the same as a steering direction of the steering wheel or not, when the vehicle is turning.

* * * * *